Sept. 28, 1971  W. B. HANSEL  3,608,192
VARIABLE RADIUS ROTARY DISK CUTTER
Filed Nov. 14, 1969
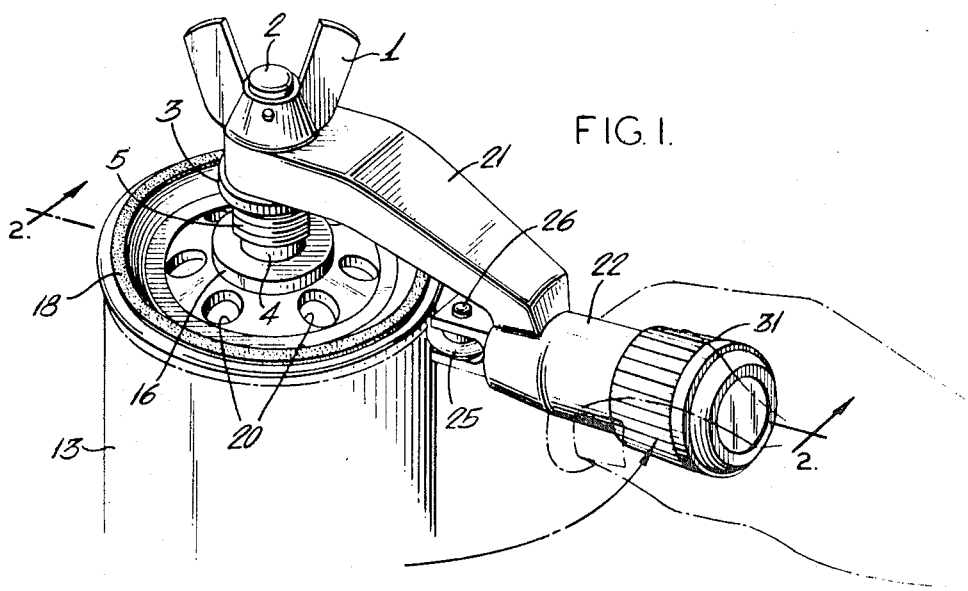
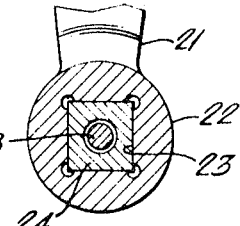
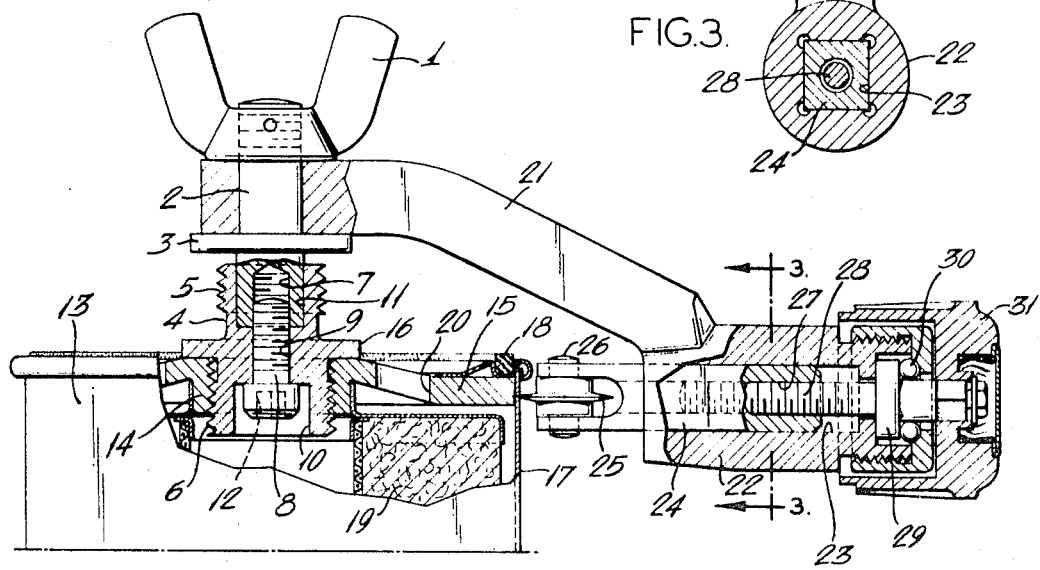
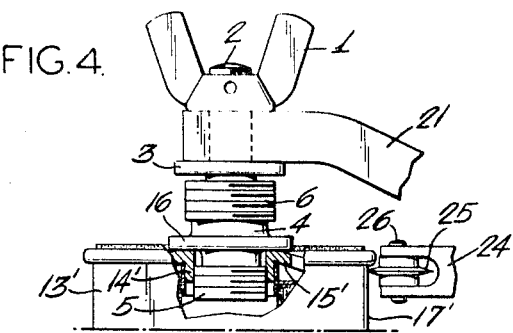
INVENTOR:
WILLIAM B. HANSEL
BY
Donald R. Johnson
ATTY.

United States Patent Office 3,608,192
Patented Sept. 28, 1971

3,608,192
VARIABLE RADIUS ROTARY DISK CUTTER
William B. Hansel, Media, Pa., assignor to Sun Oil
Company, Philadelphia, Pa.
Filed Nov. 14, 1969, Ser. No. 876,678
Int. Cl. B67b 7/30
U.S. Cl. 30—11                                    5 Claims

ABSTRACT OF THE DISCLOSURE

A tool for opening filters of the sealed "spin-on" type comprises a spindle carrying two sets of threads of different sizes adapted to mate respectively with threads provided in the bottom plates of two unlike filters, and a radially-extending arm mounted for rotation about the spindle axis. The arm carries at its outer end a cutting wheel which can be manually moved toward or away from the spindle axis.

---

This invention relates to a manually-operated cutting tool, and more particularly to a tool for cutting open filters of the so-called "spin-on" type.

"Spin-on" type filters are extensively used in the automotive industry (as lubricating oil filters), and in gasoline dispensing apparatus (as gasoline filters). These filters are sealed in a "can" or housing, and are usually "throwaways." However, in the petroleum industry, it is often desired to inspect the interiors of these filters, e.g. to ascertain why they are malfunctioning, to check or examine deposits (such as contaminants in the liquid being filtered) trapped out by the filter, etc.

In the past, it was common practice to cut the filter "cans" open by means of a hacksaw, or by using a lathe. However, cutting the "cans" open by these methods is not entirely satisfactory since disturbance or contamination of the contents of the filter results, which is to say that metallic particles produced by the cutting itself end up inside the filter. In addition, cutting open by means of a hacksaw is rather laborious and leaves a ragged cut edge, which is hazardous. Also, using a lathe is rather costly and often inconvenient and difficult.

An object of this invention is to provide a novel cutting tool for opening filters of the "spin-on" type.

Another object is to provide a filter cutting tool which produces a clean and smooth cut, one which does not disturb the contents of the filter.

A further object is to provide a filter cutting tool which is portable, simple to operate, and is inexpensive.

The objects of this invention are accomplished, briefly, in the following manner: A cutting tool has a threaded spindle and a cutting wheel which is mounted for bodily rotation around the axis of the spindle. A feed mechanism is provided for feeding the cutting wheel radially outwardly or inwardly with respect to the spindle axis. The bottom plate of the "spin-on" filter to be operated upon is threaded onto the spindle and then the cutter wheel is brought into engagement with the outer surface of the can, this wheel being rotated around the can and fed toward the can as necessary to effect a cutting through the material thereof, around the entire circumference.

A detailed description of the invention follows, taken in conjunction with the accompanying drawing, wherein:

FIG. 1 is a view illustrating a cutting tool according to this invention, as used for cutting one type of filter "can" or housing;

FIG. 2 is a sectional view taken along line 2—2 of FIG. 1;

FIG. 3 is a vertical section taken along line 3—3 of FIG. 2; and

FIG. 4 is a fragmentary view illustrating the tool in use for cutting another type of filter "can."

Referring now to the drawing, and more particularly to FIGS. 1–3, it may be stated that the tool of this invention is essentially a conversion of an existing pipe or tubing cutter, with the rotatably-mounted cutting wheel being turned 90° from its normal position. A wing nut 1 is pinned or otherwise rigidly mounted on the outer end of an operating shaft 2 which has, approximately midway along its length, an integral collar 3. A threaded spindle 4, which carries a set of external threads 5 at one end and a set of external threads 6 of larger diameter at its other end, is removably secured to the inner end of shaft 2.

In order to removably secure spindle 4 to shaft 2, an axially-extending tapped hole 7 is provided in the inner end of the shaft, and a socket-head cap screw 8 passes through a central bore 9 in the spindle 4 and engages the threads in hole 7, the head of this screw engaging the bottom of a counterbore 10 provided in one end of spindle 4. A similar counterbore 11 is provided in the other end of spindle 4, each of the counterbores 10 and 11 having a diameter such as to fit over the inner end of shaft 2 (counterbore 11 fitting over the inner end of shaft 2 in FIG. 2). The head of screw 8 has therein a recess 12 of hexagonal cross-section which opens outwardly, this recess accommodating a so-called Allen wrench of a standard size, whereby the screw 8 can be manually rotated. In FIGS. 1 and 2, the spindle 4 is illustrated as being secured to shaft 2 with the larger-diameter threads 6 outermost. However, upon removal of screw 8 the spindle 4 may be taken off shaft 2, reversed, and again secured to shaft 2 (by means of screw 8) with the smaller-diameter threads 5 outermost, that is, with counterbore 10 fitting over the inner end of shaft 2. The purpose of this will be explained hereinafter, in connection with FIG. 4.

The larger-diameter threads 6 are intended to couple the cutting tool of this invention to a "spin-on" type filter (denoted generally by numeral 13) which is rather extensively used in gasoline dispensing apparatus, for filtering the gasoline being dispensed. The threads 6 are adapted to mate with the threads in a female threaded fitting 14 provided at the center of the base or bottom plate 15 of the filter 13. The wing nut 1 attached to the outer end of shaft 2 enables this shaft to be rotated to screw the spindle threads 6 (secured to shaft 2) into fitting 14. An integral collar 16, provided on spindle 4 between the two sets of threads 5 and 6, comes into engagement with the filter bottom plate 15 to serve as a positive stop, to firmly secure filter 13 to spindle 4.

The filter 13 is manufactured as a complete unit including an outer housing or "can" or shell 17, a bottom sealing gasket 18, and interiorly-mounted solid filtering material 19. The bottom plate 15 of the filter has therein a plurality of apertures 20 through which the fluid flows when the filter is active. The "can" is formed from rather thin metal; it may be seen that it is necessary to cut completely through the material of this "can" (to thereby separate the "can" into two pieces) to gain access to the "can" interior, and particularly to the solid filtering material 19. The cutting tool of this invention effects such cutting of the "can," so that the filter may be opened. It may be here pointed out that the thickness of the bottom plate 15 is large as compared to the thickness of the "can" 17.

The inner end of an outwardly-extending rigid arm 21 is rotatably mounted on shaft 2 so that it can rotate freely with respect to shaft 2 and spindle 4 (and also with respect to a filter 13 which may be threaded onto the spindle), this end of arm 21 being retained, longitudinally of shaft 2, between wing nut 1 and collar 3. Arm 21, in addition to extending radially outwardly with respect to shaft 2 and spindle 4, extends longitudinally with respect to shaft 2, toward (and beyond) the inner end of shaft 2. The outer end 22 of arm 21 is of enlarged cross-section (see FIG. 1) and has a cylindrical cross-section. The longitudinal axis of this cylindrical portion extends at substantially 90° to the common axis of shaft 2 and spindle 4.

The cylindrical end portion 22 of arm 21 has therein an internal channel 23 of square cross-section (see FIG. 3), whose center line also extends at substantially 90° to the common axis of shaft 2 and spindle 4, and this center line is so located that, when a filter 13 is screwed "home" onto spindle 4 (i.e., so that the filter bottom plate 15 engages the adjacent face of collar 16), the extension of said center line intersects "can" 17 at a point located between the two opposite faces of bottom plate 15. A shank 24 of square cross-section, but which is bifurcated at its outer end, is slidably mounted within channel 23, in a direction lengthwise of this channel and thus radially with respect to the axis of spindle 4. At the bifurcated outer end of shank 24, such that it can rotate between the two fingers or tines of the shank, there is rotatably mounted a cutting wheel 25, which latter is rotatably mounted on a fixed pin 26 secured in the tines of the shank 24 and whose axis is parallel to the common axis of shaft 2 and spindle 4. The center line of channel 23, previously referred to, passes through the sharpened or beveled edge of cutting wheel 25. Thus, when a filter 13 is screwed "home" onto spindle 4, the cutting edge of wheel 25 is adapted to come into cutting engagement with "can" 17 at a location between the two opposite faces of filter bottom plate 15.

Means are provided for moving the cutting wheel 25 in a radial direction with respect to the axis of spindle 4, and thus parallel to the thickness dimension of "can" 17. Such means will now be described. An axial hole 27 extends through the entire length of shank 24, and a considerable portion of the length of this hole, from the end of the shank opposite to cutting wheel 25 toward this wheel, is tapped. A member 28, whose inner end is threaded to match the threads in hole 27 and whose outer end has a square cross-section, is mounted axially in channel 23 and is free to rotate therein but is prevented from moving longitudinally by means of an integral collar 29 and thrust balls 30. A manual operating knob 31, whose outer surface is knurled or grooved for increased friction, is fastened securely to the outer squared end of member 28, for manually rotating the latter; the threads on the inner end of member 28 engage the threads in hole 27. Since the square shank 24 is prevented from rotating within channel 23 and since the member 28 is prevented from moving longitudinally within this channel, it may be seen that manual rotation of knob 31 causes longitudinal movement (with respect to channel 23) of shank 24, and hence also of cutting wheel 25 mounted on this shank. This produces the desired feeding of cutting wheel 25 in a radial direction with respect to the axis of spindle 4 (and thus toward, and eventually through, the "can" 17).

The operation of the cutting tool of this invention should now be apparent. The filter 13 to be opened is mounted on the tool by screwing the threads 6 on spindle 4 into fitting 14 of the filter, until plate 15 engages collar 16. Then, while grasping the control knob 31 as illustrated in FIG. 1, the arm 21 is rotated about the axis of spindle 4, while holding the spindle and filter stationary, thus rotating the cutting wheel 25 bodily about this same axis. As this wheel thus rotates bodily, it rotates as necessary about its own axis defined by pin 26. While the arm and cutting wheel are thus being rotated bodily, the control knob 31 is rotated as necessary to feed the cutting wheel 25 into and through the wall of "can" 17, thus severing this can around its entire circumference. During this cutting by the cutting wheel, the relatively thick filter bottom plate 15 provides a rigid "back-up" for the cutting wheel as it is cutting through the relatively thin-walled "can" 17. When the "can" 17 is completely severed, the severed end of the "can" may be removed from the remainder of the filter cartridge, for access to the interior thereof.

The application of the cutting tool of this invention to automobile oil filters is illustrated in FIG. 4. The threads 5 of the spindle 4 are sized to mate with the threads in a female threaded fitting 14' provided at the center of the base or bottom plate 15' of the oil filter 13'.

When it is desired to cut open an oil filter 13', the spindle 4 is removed from shaft 2, reversed from the position illustrated in FIG. 2, and then resecured to shaft 2 (as previously described), in such a position that the spindle threads 5 are outermost. Then, the oil filter 13' is threaded onto these latter threads, and the filter can 17' is severed in a manner exactly similar to that previously described in connection with the gasoline filter 13.

The cutting wheel 25 is in reality "squeezed through" the material of the can 17 or 17', and this effects a clean cut, without the production of any metallic particles and thus without contaminating the "innards" of the filter which is being opened. This is in marked contrast to cutting open the filter by use of a hacksaw or lathe, both of which procedures inherently result in the production of metallic particles.

I claim:
1. For use with "spin-on" type filters having an upstanding outer housing secured to a threaded bottom plate: a cutting tool comprising a spindle carrying two sets of threads of different sizes adapted to mate respectively with the threads provided in the bottom plates of two unlike filters, said spindle being selectively adjustable to place one or the other of said two sets of threads in an operative position, a cutting wheel, means mounting said wheel for bodily rotation about the axis of said spindle, and means for moving said wheel in a radial direction with respect to said spindle axis.

2. Structure set forth in claim 1, including also a shaft to which said spindle is adjustably secured in order to place one or the other of said two sets of threads in an operative position.

3. Structure as defined in claim 2, wherein the wheel mounting means includes an outwardly-extending arm whose inner end is rotatably mounted on said shaft, said arm carrying said wheel at its outer end.

4. Structure according to claim 3, wherein said wheel is journaled for rotation about its own axis, at the outer end of said arm.

5. Structure according to claim 3, wherein said wheel moving means is located at the outer end of said arm.

References Cited
UNITED STATES PATENTS

| | | | |
|---|---|---|---|
| D. 50,005 | 12/1916 | Woelz | 30—310X |
| 1,524,996 | 2/1925 | Porrier | 30—19 |
| 1,560,067 | 11/1925 | Luber | 30—17 |
| 3,082,523 | 3/1963 | Modes | 30—102X |
| 3,085,327 | 4/1963 | Douis | 30—21.5X |

FOREIGN PATENTS

| | | | |
|---|---|---|---|
| 945,215 | 7/1956 | Germany | 30—310 |

OTHELL M. SIMPSON, Primary Examiner

G. L. SMITH, Assistant Examiner

U.S. Cl. X.R.

30—21.5, 310